(12) United States Patent
Tvetene

(10) Patent No.: US 9,688,476 B1
(45) Date of Patent: Jun. 27, 2017

(54) SOD HARVESTER

(71) Applicant: Gregg Tvetene, Billings, MT (US)

(72) Inventor: Gregg Tvetene, Billings, MT (US)

(73) Assignee: TREBRO MANUFACTURING, INC, Billings, MT (US)

( * ) Notice: Subject to any disclaimer, the term of this patent is extended or adjusted under 35 U.S.C. 154(b) by 0 days.

(21) Appl. No.: 14/999,390

(22) Filed: May 2, 2016

(51) Int. Cl.
B65G 15/24 (2006.01)
A01B 45/04 (2006.01)
B65G 21/20 (2006.01)

(52) U.S. Cl.
CPC .......... B65G 21/2054 (2013.01); A01B 45/04 (2013.01); A01B 45/045 (2013.01)

(58) Field of Classification Search
CPC ........ B65G 15/14; B65G 15/16; A01B 45/04; A01B 45/045
USPC ... 198/836.1, 599, 607, 626.1, 626.3, 626.4; 172/19, 20
See application file for complete search history.

(56) References Cited

U.S. PATENT DOCUMENTS

| | | | | |
|---|---|---|---|---|
| 3,698,534 A * | 10/1972 | Hadfield | ............... | A01B 45/04 198/304 |
| 3,887,013 A * | 6/1975 | Helberg | ............... | B65G 57/245 172/20 |
| 4,777,890 A * | 10/1988 | Raymond | ............ | A01B 45/045 111/100 |
| 4,966,239 A * | 10/1990 | Hutchison | ............ | A01B 45/045 172/20 |
| 5,217,078 A * | 6/1993 | Zinn | .................... | A01D 87/003 172/19 |
| 5,626,195 A * | 5/1997 | Dover | .................. | A01B 45/045 172/19 |
| 6,056,064 A * | 5/2000 | deVries | .................. | A01B 45/04 172/19 |
| 6,273,196 B1 * | 8/2001 | Van Vuuren | ......... | A01B 45/045 172/20 |
| 6,364,027 B1 * | 4/2002 | Tvetene | ............... | A01B 45/045 172/1 |
| 7,021,584 B2 * | 4/2006 | Hendriks | ............... | A01B 45/04 172/19 |
| 7,264,063 B1 * | 9/2007 | Dover | .................... | A01B 45/04 172/2 |
| 7,641,327 B2 * | 1/2010 | Jones | ..................... | C09D 11/34 347/103 |
| 2001/0050174 A1 * | 12/2001 | Van Vuuren | ......... | A01B 45/045 172/20 |

* cited by examiner

Primary Examiner — James R Bidwell
(74) Attorney, Agent, or Firm — Jacobson & Johnson LLC

(57) ABSTRACT

A sod harvester having a sod hold down with at least one free wheeling elastic belt that maintains a downward pressure on sod slabs carried on a conveyor belt with the free wheeling elastic belt moving in unison with the conveyor belt through frictional engagement between sod slabs on the conveyor belt and the free wheeling belt or between the conveyor belt and idler pulleys, which rotationally support the elastic belt, to enable the hold down to prevent or inhibit slippage of the sod slabs on the conveyor belt during sod slab transfer thereon.

19 Claims, 4 Drawing Sheets

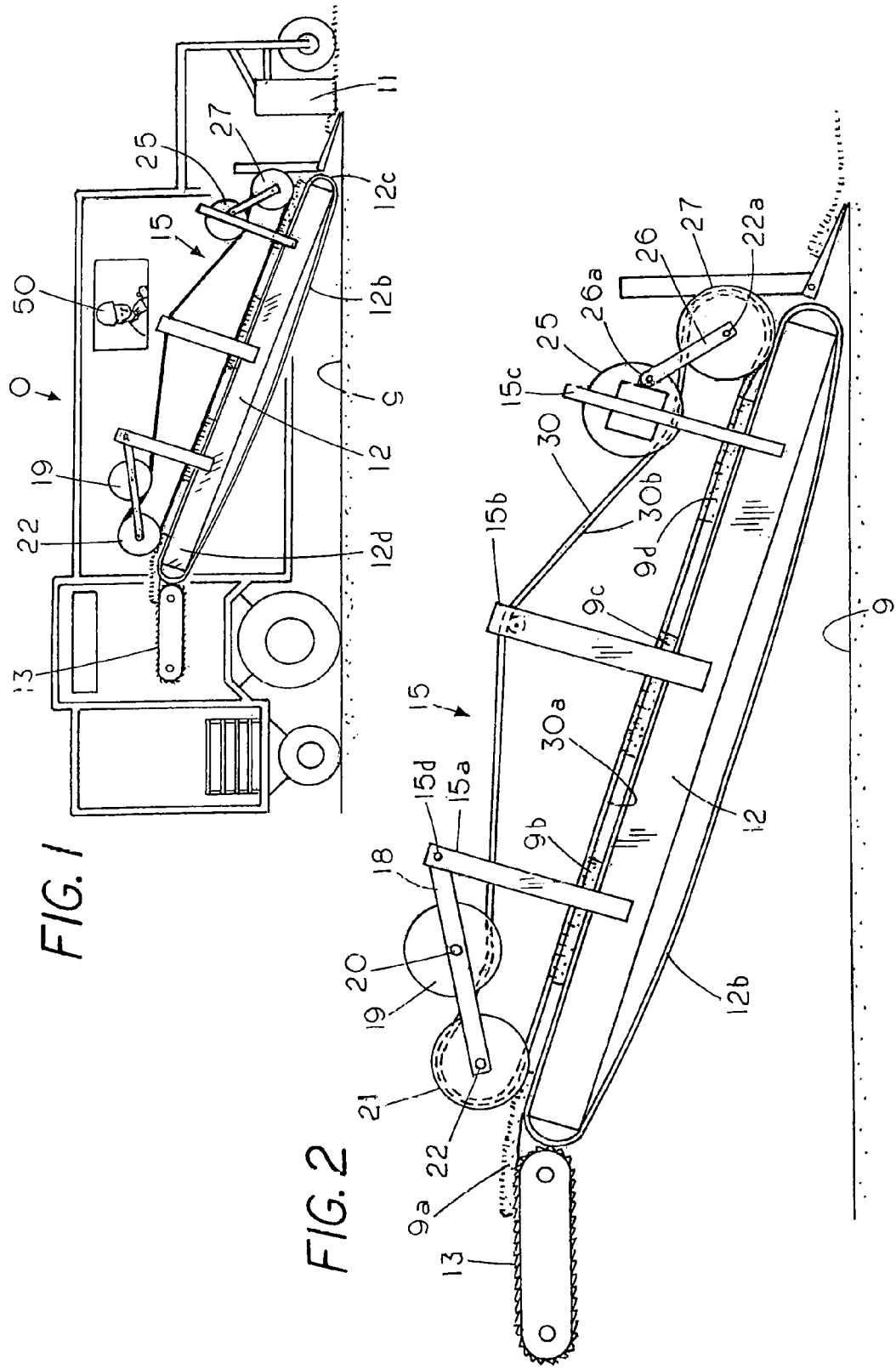

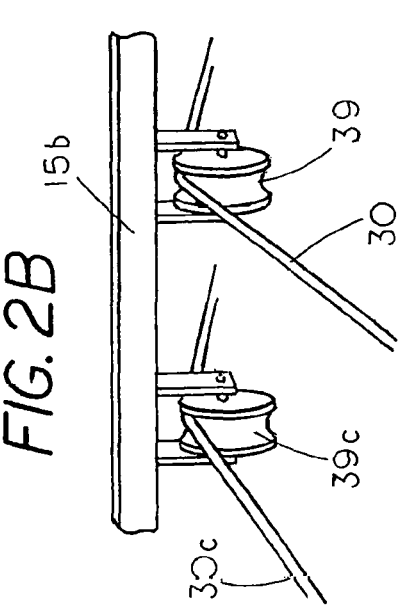
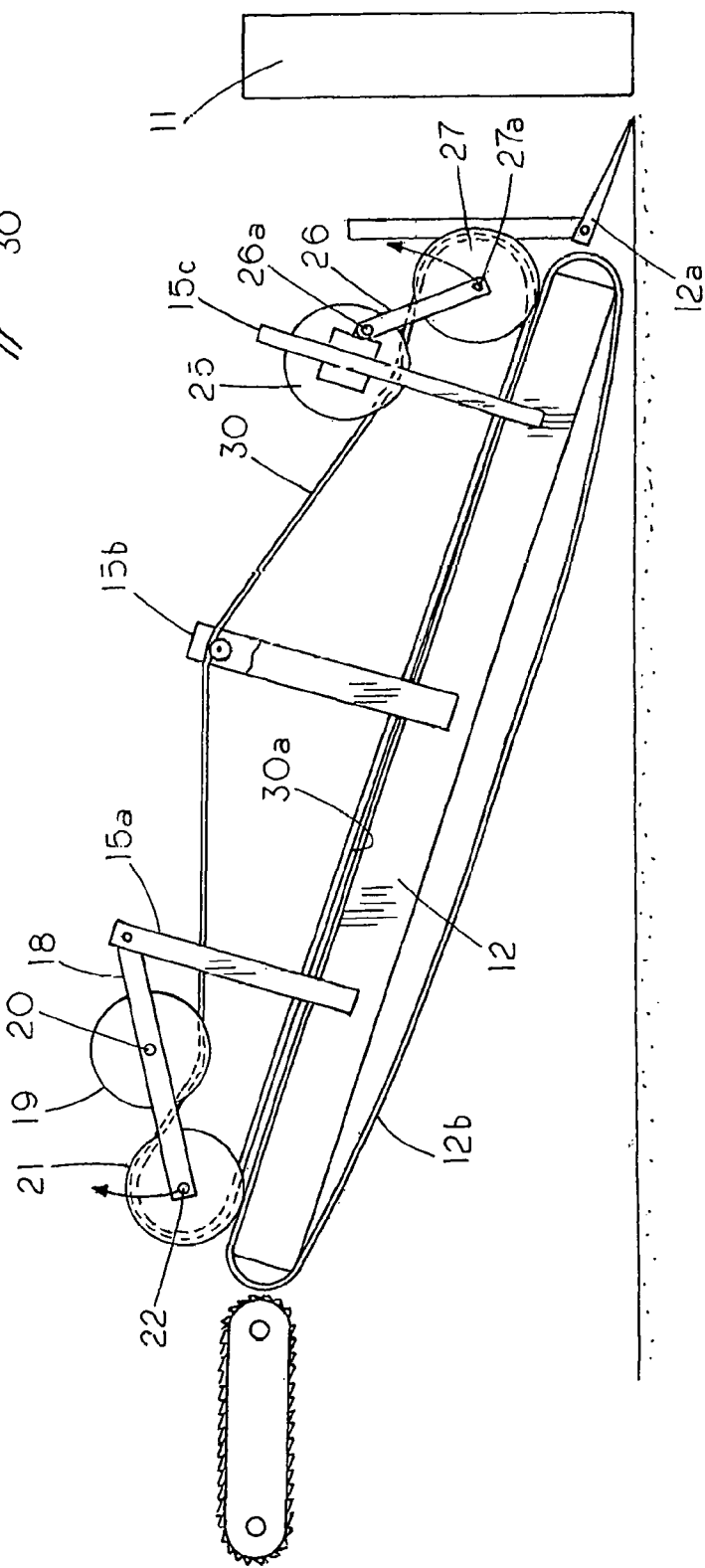

SOD HARVESTER

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of on-the-go sod harvesters that can in a continuous operation cut a sod slab from a sod field and then stack the cut sod slab on a pallet, which can then be transferred to a work site by another vehicle, are known in the art. Typically, the sod harvester includes a set of knives that cuts a flat sod slab from the sod field. The sod slab, which may be left in slab form, is typically elevated upward from the sod field on a conveyor belt that discharges the sod slab onto a sod transfer mechanism. The sod slab is subsequently transferred to a sod pallet for further handling. The sod pallet with a stack of sod slabs thereon can then be transferred to a work site where the sod slabs are removed from the pallet and applied to the field. Examples of sod harvester for on-the-go harvesting are shown in Tvetene et al. U.S. Pat. Nos. 6,296,063; 6,783,318 and 6,364,027.

Occasionally, during the sod harvesting process the conditions of the sod soil may effect how the sod slab can be elevated from ground level to a location where the sod slabs can be stacked for delivery to a work site. Typically, the sod slabs are carried on a conveyor belt, which operates at an acute angle with respect to the horizon. Some times soil conditions cause the sod slab to slip on the sod conveyor, which can either jam the sod conveyor or cause damage to the sod slab. The failure of the sod slab to smoothly follow the sod slab conveyor requires operator correction and increases the time to complete the sod harvesting process as well as increases the spoilage due to a sod slab being damaged as the conveyor belt elevates the sod slab from ground level to the sod stacking mechanism in the sod harvester.

SUMMARY OF THE INVENTION

A sod harvester having a sod hold down with at least one free wheeling elastic belt that maintains a downward pressure on sod slabs carried on a conveyor belt with the free wheeling elastic belt moving in unison with the conveyor belt through frictional engagement between sod slabs on the conveyor belt and the free wheeling belt or between the conveyor belt and idler pulleys, which rotationally support the elastic belt, to enable the hold down to prevent or inhibit slippage of the sod slabs on the conveyor belt during sod slab transfer thereon.

BRIEF DESCRIPTION OF THE DRAWINGS

FIG. 1 is a side view of a sod harvester with an elevating sod slab conveyor and a sod hold down with a plurality of sod slabs conveyed from a low end of the sod slab conveyor to a high end of the sod slab conveyor;

FIG. 2 is an isolated side view of the elevating sod slab conveyor and sod hold down of FIG. 1 as a plurality of sod slabs are being conveyed from a low end of the sod slab conveyor to a high end of the sod slab conveyor;

FIG. 2A is an isolated side view of the elevating sod slab conveyor and sod hold down of FIG. 2 without sod slabs being conveyed from a low end of the sod slab conveyor to a high end of the sod slab conveyor;

FIG. 2B is an isolated view of a set of hanging pulleys in the sod hold down for engaging an inside face of a set of elastic belts in the sod hold down;

DESCRIPTION OF THE PREFERRED EMBODIMENT

Figure 3:
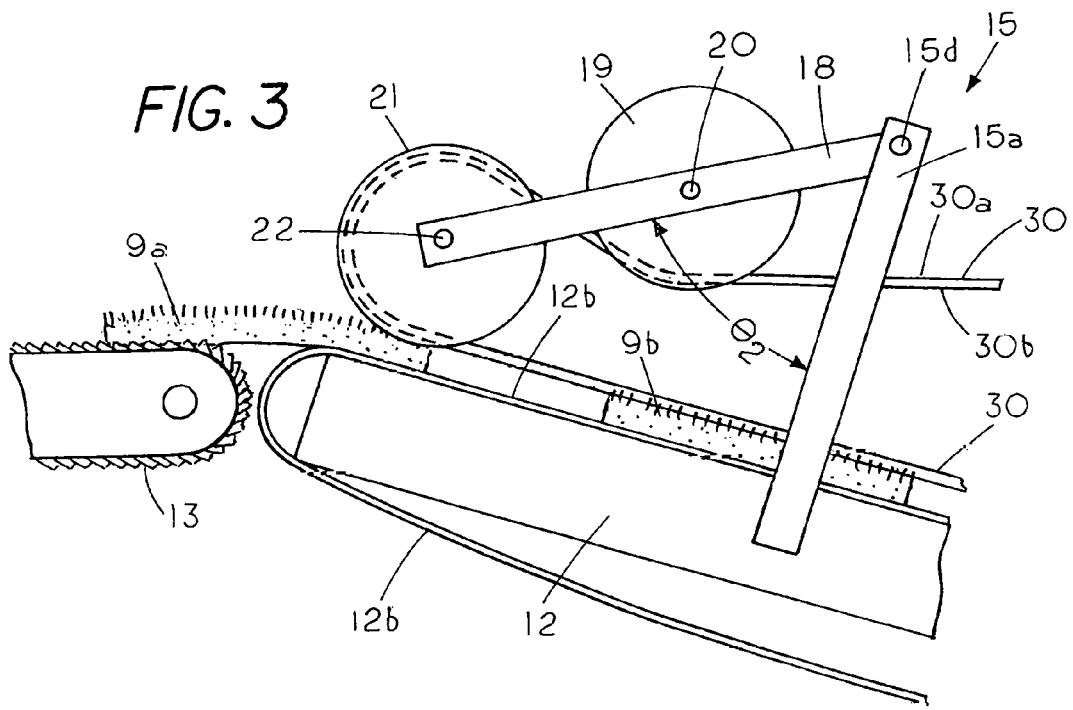
FIG. 3 is an enlarged partial side view of the top end pulleys and an elastic belt in the sod hold down showing the position of the elastic belt and the idler pulleys as sod slabs are conveyed up the sod slab conveyor.

FIG. 1 is a side view of a sod harvester 10 having a sod slab-elevating conveyor 12 that elevates sod slabs, which have been cut from a sod field 9 by sod cutter 11, to a transfer conveyor 13 within the sod harvester that delivers the sod slabs to a sod stacking mechanism within the sod harvester. A driver 50 located in a cab within the sod harvester 10 drives the sod harvester as well as observes the transporting of sod slabs from a first ground end 12c of the sod slab conveyor 12 to a higher elevation at an opposite end 12d of sod slab conveyor 12.

Figure 4:
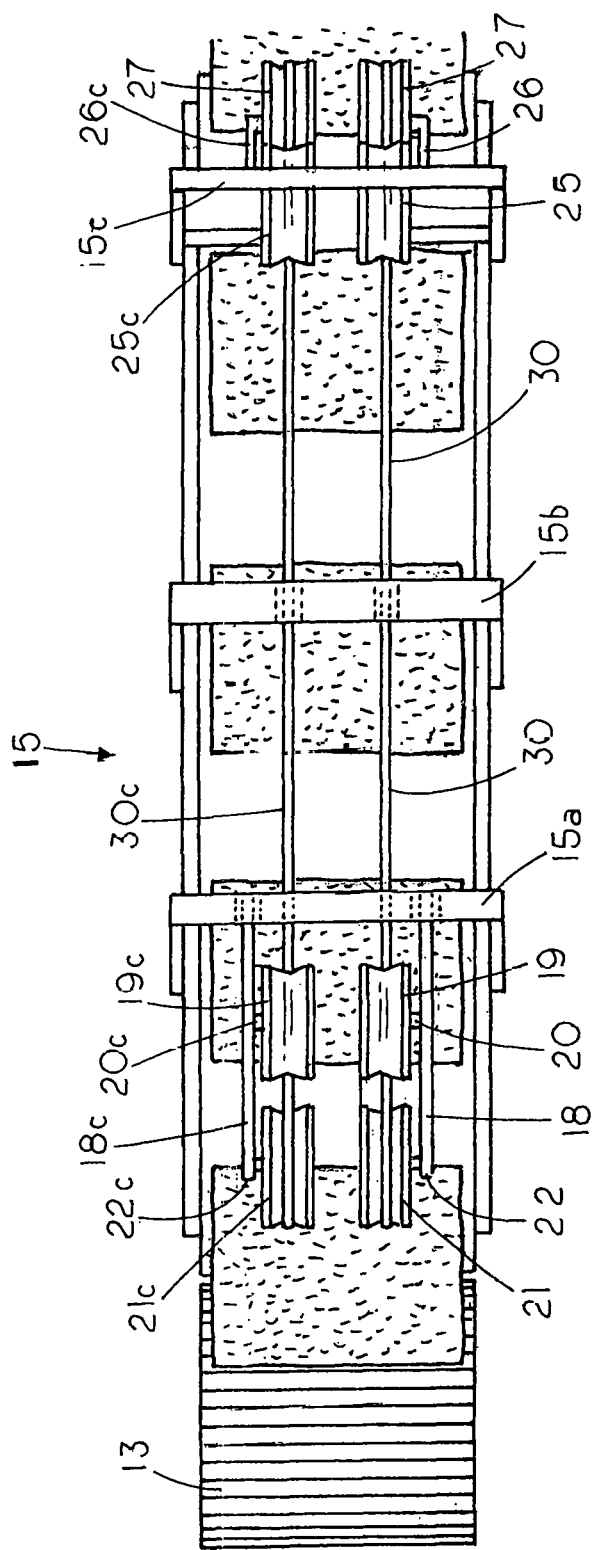
FIG. 4 is a top view of the sod hold down with a set of pulleys and a pair of elastic belts located in a parallel condition above a plurality of sod slabs, which are carried by the sod slab conveyor.

FIG. 2 shows an isolated side view of a sod slab hold down 15 and FIG. 4 shows a top isolated view of the sod slab hold down 15 that resiliently maintains sod slabs in alignment with a conveyor belt 12b. In the example shown in FIG. 2 and FIG. 4 a set of two free wheeling elastic belts 30 and 30c are brought into top engagement with the sod slabs on the conveyor to hold the sod slabs in conveyor alignment as the sod slabs are conveyed from end to end of the conveyor 12. The top engagement of the sod slabs with the elastic belts not only holds the sod slabs in place it also causes the elastic belts to move in unison with the sod slabs on the conveyor belt 12b thus avoiding damage to the sod slabs from the elastic belt contact. A suitable elastic belt 30 or 30c, which have an inherent resiliency, are O-ring belts as they are elastomeric and can stretch and contract in response to external forces on the belt although other types of belts may be used without departing from the spirit and scope of the invention.

The side view in FIG. 2 shows that sod hold down 15 includes, a first end frame upright 15a attached to conveyor 12, a middle frame upright 15b attached to conveyor 12 and a second end frame upright 15c attached to conveyor 12, with each upright extending above an endless conveyor belt 12b on the sod slab conveyor 12 to provide support for a free wheeling sod hold down 15. Sod hold down 15 includes a first set of idler pulleys 19 and 21 that are rotatably mounted on arm 18, which is pivotally supported at a first end of the conveyor 12 by a pivot pin 15*d* in frame upright 15*a*. A second set of idler pulleys 25 and 27 are rotatably mounted on frame upright 15*c*. Pulley 25 is rotatably mounted on upright 15*c* and pulley 27 is rotatably mounted on pivotable arm 26 through an axle 22*a*. Arm 26 is pivotally supported by frame upright 15*c* though a pivot pin 26*a* that allows the arm 26 with pulley 27 thereon to pivot thereabout in response to the presence or absence of a sod slab on the conveyor belt 12*c*. A first elastic belt 30 extends from the first set of pulleys 19 and 21 to the second set of pulleys 25 and 27 with the elasticity of belt 30 urging the first set of pulleys 19 and 21 and pulley 27 in the second set of pulleys 25 and 27 toward each other through the pivoting of arm 18 around pivot pin 15*d* and arm 26 around pivot pin 26*a*. In this example frame 15*b* includes a circumferentially grooved pulley 39 (FIG. 2B), which is located on an inside face of belt 30, to maintain a top portion of belt 30 in an out of the way condition above the sod slabs on the conveyer 12 as well as a second circumferentially grooved pulley 39*c*, which is located on an inside face of belt 30*c*, to maintain a top portion of belt 30*c* in an out of the way condition above the sod slabs on the conveyer 12. FIG. 2 shows the lower portion of elastic belt 30 has an outside face 30*a* in engagement with sod slabs 9*a*, 9*b*, 9*c* and 9*d* on the conveyor belt 12*b* to maintain the orientation of the sod slabs as the conveyor belt 12*b* elevates the sod slabs thereon for delivery to the sod transfer conveyor 13. In this example the engagement of the pulley 22 and the engagement of the elastic belt 30 with the sod slabs causes the belt 30 to travel in unison with the conveyor belt while at the same time maintaining the sod slabs in position for later transfer within the sod harvester. That is, the elasticity of the hold down elastic belt 30 maintains the hold down belt 30 in a motion transfer engagement with the conveyor belt 12*b*. Similarly, the elasticity of the hold down elastic belt 30*c* maintains the hold down belt 30*c* in a motion transfer engagement with the conveyor belt 12*b*.

FIG. 2A is identical to FIG. 2 except FIG. 2A shows the side view of the sod hold down 15 without any sod slabs on the conveyor belt 12. Note, the peripheral contact of pulley 22 with the conveyor belt 12*b* as well as the face 30*a* of belt 30, which is caused by the resiliency of the elastic belt 30. In this example the conveyor belt 12*b* rotates in a counter clockwise direction while the elastic belt 30 on the free wheeling sod hold down 15 is driven in a clockwise direction through frictional engagement with conveyor belt 12. As can be seen in FIG. 2A that with or without sod slabs the conveyor belt 12*b* rotates the drive belt 30 since the drive belt 30 is in a free wheeling mode as the pulleys supporting drive belt 30 are idler pulleys as opposed to drive pulleys although there may be some beneficial assist from pulley 21 and 27 through contact of the idler pulleys with either the conveyer belt or the sod slabs. In the example shown each of the idler pulleys include a circumferential groove therein to maintain a positive tracking of an elastic belt therein.

FIG. 4 is a top view of sod hold down 15 revealing a third set of pulleys 19*c* and 21*c*, an elastic belt 30*c* and a fourth set of pulleys 25*c* and 27*c*, which are identical to the first set of pulleys 19 and 21, the elastic belt 30 and the second set of pulleys 25 and 27. In this example pulleys 19, 21, 25 and 27 as well as elastic belt 30 are located in a first vertical plane and the pulleys 19*c*, 21*c*, 25*c* and 27*c* as well as elastic belt 30*c* are located in a second plane, which is parallel to the first vertical plane with both elastic belt 30 and elastic belt 30*c* coacting to maintain sod slabs in position as the sod slabs are transported along the conveyor 12.

FIG. 4 shows that the pulleys 21*c* and 19*c* are mounted on a pivotable arm 18*c*, which pivots about a pivot pin 15*d* (FIG. 2) on upright 15*a* and that pulley 27*c* is mounted on a pivotable arm 26*c* that pivots about a pivot pin 26*a* (FIG. 2). The side-by-side mounting of the elastic belt 30 and elastic belt 30*c* provide contact with the sod slabs on spaced apart locations on the sod slab to maintain the sod slab in proper orientation as it is transferred along conveyor belt 12. Although a set of side-by-side free wheeling elastic cord belts 30 and 30*c* are shown it is envisioned that a single wide belt may be used without departing from the spirit and scope of the invention.

FIG. 3 shows a partial side view of hold down 15 showing pulleys 19 and 21 and arm 18 of sod hold down 15 when sod slabs 9*a* and 9*b* are located on conveyor belt 12*b*. Note, in this position the arm 18, which supports idler pulley 19 and idler pulley 21 makes an angle $\Theta_2$ with the upright 15*a*.

Figure 3A:
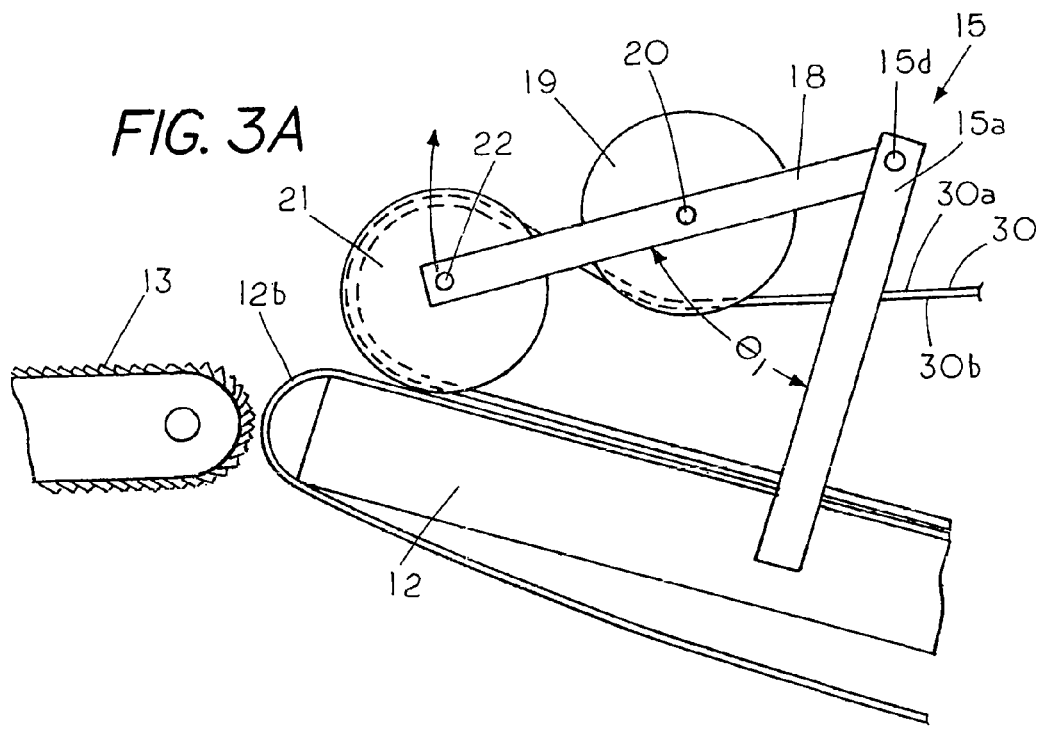
FIG. 3A is an enlarged partial view of the top pulleys and elastic belt in the sod hold down showing the position of the elastic belt and the idler pulleys in the sod hold down without sod slabs being conveyed up the sod slab conveyor.

FIG. 3A shows an identical partial side view of hold down 15 showing idler pulley 19 and idler pulley 21 and arm 18 of sod hold down 15 when there are no sod slabs present on conveyor belt 12*b*. Note, in this position the arm 18, which supports pulley 19 and 21 makes an angle $\Theta_1$ with the upright 15*a*.

FIG. 3A (without the sod slabs) shows arm 18 pivoted at an angle $\Theta_1$ about pivot pin 15*d* while FIG. 3 (with the sod slabs) shows arm 18 pivoted at an angle $\Theta_2$ about pivot pin 15*d* where the angle $\Theta_2$ is greater than the angle $\Theta_1$. In this example the downward or counter clockwise pivoting of arm 18, which is illustrated by FIG. 3 and FIG. 3A is generated through the elasticity of the belt 30. That is, by placing elastic belt 30 in tension through engagement with the set of idler pulleys on the opposite ends of hold down 15 generates a counter clockwise torque on arm 18 that brings the belt 30 into engagement with the top of the sod slabs with sufficient force so as to maintain the sod slabs in place on the conveyor belt 12 as the sod slabs are carried thereon. Similarly, by placing elastic belt 30*c* in tension through engagement with the set of idler pulleys on the opposite ends of hold down 15 generates a counter clockwise torque on arm 18*c* that brings the belt 30 into engagement with the top of the sod slabs with sufficient force so as to maintain the sod slabs in place on the conveyor belt as the sod slabs are carried thereon. Likewise the clockwise torque on pivotable arm 26 from elastic belt 30 brings elastic belt 30 into contact with sod slabs on the conveyor belt 12. In this example the operation of elastic belt 30*c* is identical to elastic belt 30.

Thus the invention includes a method of transferring a sod slab along a conveyor 12 while maintaining the sod slab in a conveying condition by elevating the sod slab onto a conveyor belt 12*b* and bringing a hold down belt 30 or 30*c* supported by a set of idler pulleys into engagement with a top surface of a sod slab on the sod conveyor belt 12*b* with sufficient force to hold the sod slab proximate the conveyor and rotate the hold down belt in unison with the conveyor belt through frictional engagement of the hold down belt with a top surface of the sod slab on the conveyor belt. In the example shown the elasticity of the belts are used to pivot the idler pulleys 21 and 27, 21*c* and 27*c* toward each other and bring the belts down into contact with the sod slabs. That is, the elastic belt 30 is used to pivot the arm 18 and arm 26 toward each other through the pulleys 21 and 27, which are located on opposite ends of the hold down 15. An alternate method is to pivot arm 18 and arm 26 toward each other using an external tensioner such as a spring or the like between arm 18 and arm 26 or between arm 18 and upright 15*a* and between arm 26 and upright 15*c* that causes the arm 18 and arm 26 to pivot toward the sod slabs to bring the belt into top engagement with the sod slabs on the conveyor. With the use of an external tensioner in the form of springs or the like either one or more of an inelastic belt or an elastic belts may be used as a hold down for the sod slabs.

I claim:

1. A sod harvester having a sod slab conveyor extending at an acute angle to the horizon with a first end of the sod slab conveyor located a lower elevation than an opposite end of of sod slab conveyor
   a frame extending above a conveyor belt on the sod slab conveyor with a conveyor driven sod hold down including a first set of pulleys pivotally supported at a first end of the frame and a second set of pulleys pivotally supported at an opposite end of the frame; and
   a first elastic belt and a second elastic belt extending from the first set of pulleys to the second set of pulleys with an elasticity of the first belt and an elasticity of the second belt urging the first set of pulleys, the second set of pulleys, an outside face of the first elastic belt and an outside face of the second elastic belt into engagement with either the conveyor belt or a sod slab on the conveyor belt to thereby maintain the sod slab on the conveyor belt during transporting thereon.

2. The sod harvester of claim 1 wherein a frictional engagement between the conveyor belt and the sod slab thereon causes the first elastic belt and the second elastic belt to rotate in unison with the rotation of the conveyor belt.

3. The sod harvester of claim 1 wherein the first elastic belt and the second elastic belt are cord belts.

4. The sod harvester of claim 1 wherein the first elastic belt is an elastomeric belt and the second elastic belt is an elastomeric belt.

5. The sod harvester of claim 1 wherein each of the elastic belts are O-ring belts.

6. The sod harvester of claim 1 wherein each of the first set of pulleys and the second set of pulleys have a circumferential groove for maintaining a belt in alignment therewith.

7. The sod harvester of claim 1 including a first arm pivotally attached to the first end of the frame with the first arm supporting the first set of pulleys with at least one of the first set of pulleys located on an inside face of the elastic belt.

8. A sod harvester having a sod slab conveyor extending at an acute angle to the horizon with a first end of the sod slab conveyor located a lower elevation than an opposite end of sod slab conveyor including:
   a sod hold down including a first pulley supported at a first end of the sod hold down and a second pulley supported at an opposite end of the sod hold down; and
   a free wheeling elastic belt extending from the first pulley to the second pulley with an elasticity of the elastic belt bringing the elastic belt into a top engagement with a sod slab on a sod slab conveyor belt to thereby hold the sod slab in a conveying condition on the conveyor belt as the elastic belt moves in unison with the sod slab conveyor belt through frictional engagement with the sod slab on the sod slab conveyor.

9. The sod harvester of claim 8 wherein the first pulley and the second pulley are idler pulleys with the first idler pulley mounted on a first pivot arm and the second idler pulley mounted on a second pivot arm.

10. The sod harvester of claim 8 wherein the elastic belt is an elastomeric belt.

11. The sod harvester of claim 8 wherein the elastic belt is an O-ring belt.

12. The sod harvester of claim 8 including at least two parallel elastic belts spaced apart from each other with each having an outside face for spaced apart parallel frictional engagement of a sod slab on the sod slab conveyor belt.

13. The sod harvester of claim 8 wherein the first end of the sod hold down includes a first pivotable arm rotatably supporting the first idler pulley and a second idler pulley.

14. The sod harvester of claim 13 wherein the second end of the sod hold down includes a second pivotal arm supporting the second pulley wherby one of the pivotal arms pivots in a clockwise direction and the other pivotal arm pivots in a counter clockwise direction to bring the elastic belt into top engagement with a sod slab located on the sod slab conveyor.

15. The sod harvester of claim 14 including an idler pulley mounted to the second end of the frame.

16. The method of transferring a sod slab along a conveyor while maintaining the sod slab in a conveying condition comprising the steps of:
   elevating the sod slab onto a conveyor belt;
   bringing at least two hold down belts supported by a set of idler pulleys into engagement with a top surface of a sod slab on the sod conveyor belt with sufficient force to hold the sod slab proximate the conveyor and rotate the at least two hold down belts in unison with the conveyor belt through frictional engagement of the at least two hold down belts with a top surface of the sod slab on the conveyor belt.

17. The method of claim 16 wherein the step of bringing the at least two hold down belts into engagement with a top surface of the sod slab comprises bringing an at least two elastic hold down belts into engagement with the top surface of the slab wherein an inherent elasticity of the at least two elastic belts is used to resiliently maintain the top surface of the sod slab in engagement with the at least two elastic hold down belts as the sod slab is carried on the conveyor belt.

18. The method of claim 16 including the step of solely using an elasticity of the at least two hold down belts to maintain the at least two hold down belts in a motion transfer engagement with the conveyor belt.

19. The method of transferring a sod slab along a conveyor while maintaining the sod slab in a conveying condition comprising the steps of:
   elevating the sod slab onto a conveyor belt;
   bringing a hold down belt supported by a set of idler pulleys into engagement with a top surface of a sod slab on the sod conveyor belt with sufficient force to hold the sod slab proximate the conveyor and rotate the hold down belt in unison with the conveyor belt through frictional engagement of the hold down belt with a top surface of the sod slab on the conveyor belt including the step of bringing the hold down belt into engagement with the top surface of the sod slab comprises pivoting a first arm carrying a first idler pulley toward a second arm carrying a second idler pulley with a spring to bring an outside face of the hold down belt into engagement with the sod slab on the sod conveyor belt.

* * * * *

UNITED STATES PATENT AND TRADEMARK OFFICE
CERTIFICATE OF CORRECTION

| | | |
|---|---|---|
| PATENT NO. | : 9,688,476 B1 | Page 1 of 1 |
| APPLICATION NO. | : 14/999390 | |
| DATED | : June 27, 2017 | |
| INVENTOR(S) | : Tvetene | |

It is certified that error appears in the above-identified patent and that said Letters Patent is hereby corrected as shown below:

Column 5 Line 9 "CONVEYOR" should read --CONVEYOR COMPRISING--;

Column 6 Line 12 "THE SECOND END" should read --THE OPPOSITE END--; and

Column 6 Line 20 "THE SECOND END" should read --THE OPPOSITE END--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*